(12) United States Patent
Beuneken et al.

(10) Patent No.: US 11,480,301 B2
(45) Date of Patent: Oct. 25, 2022

(54) CRYOGENIC FLUID STORAGE TANK

(71) Applicant: L'Air Liquide, Societe Anonyme pour l'Etude et l'Exploitation des Procedes Georges Claude, Paris (FR)

(72) Inventors: Olivier Beuneken, Le Blanc Mesnil (FR); Didier Geneste, Paris (FR); Regis Pointeau, Paris (FR)

(73) Assignee: L'Air Liquide, Société Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 17/311,214

(22) PCT Filed: Nov. 25, 2019

(86) PCT No.: PCT/FR2019/052793
§ 371 (c)(1),
(2) Date: Jun. 4, 2021

(87) PCT Pub. No.: WO2020/115395
PCT Pub. Date: Jun. 11, 2020

(65) Prior Publication Data
US 2022/0026024 A1 Jan. 27, 2022

(30) Foreign Application Priority Data

Dec. 6, 2018 (FR) ........................................ 1872429

(51) Int. Cl.
*F17C 5/02* (2006.01)
*F17C 13/02* (2006.01)

(52) U.S. Cl.
CPC .............. *F17C 5/02* (2013.01); *F17C 13/025* (2013.01); *F17C 2201/0109* (2013.01);
(Continued)

(58) Field of Classification Search
CPC .. F17C 5/02; F17C 5/06; F17C 13/025; F17C 2201/0109; F17C 2201/032;
(Continued)

(56) References Cited

U.S. PATENT DOCUMENTS 5,121,609 A * 6/1992 Cieslukowski ........... F17C 7/02
123/527
5,228,295 A * 7/1993 Gustafson ................. F17C 9/00
62/7

(Continued)

FOREIGN PATENT DOCUMENTS

FR 2 238 893 2/1975
FR 2 841 963 1/2004
(Continued)

OTHER PUBLICATIONS

International Search Report and Written Report for PCT/FR2019/052793, dated Mar. 12, 2020.
(Continued)

*Primary Examiner* — Nicolas A Arnett
(74) *Attorney, Agent, or Firm* — Christopher J. Cronin

(57) ABSTRACT

Cryogenic fluid storage tank comprising a pipe for drawing off vaporized gas, which pipe is connected to a first casing and comprises a vaporizer and at least one control valve, a first filling pipe connected to the lower portion of the first casing, a second pipe for filling a downstream end connected to the upper portion of the first casing, a distribution valve (Continued)

assembly configured to enable distribution of the fluid from the fluid source in the filling pipes, a pressurization pipe connected to the lower end of the first casing and a second end connected to the upper portion of the first casing and at least one control valve and a heater, the tank further comprising an air vent regulator, the valve assembly for distribution in the filling circuit, the valve for controlling the pressurization pipe, the valve for controlling the drawing-off circuit and the air vent regulator being integrated into the same valve module, which shares at least one valve element.

15 Claims, 3 Drawing Sheets

(52) U.S. Cl.
CPC ............... *F17C 2201/032* (2013.01); *F17C 2203/0391* (2013.01); *F17C 2205/0326* (2013.01); *F17C 2205/0332* (2013.01); *F17C 2205/0338* (2013.01); *F17C 2205/0352* (2013.01); *F17C 2221/014* (2013.01); *F17C 2223/0161* (2013.01); *F17C 2225/0161* (2013.01); *F17C 2225/033* (2013.01); *F17C 2227/0393* (2013.01); *F17C 2250/043* (2013.01); *F17C 2250/0626* (2013.01); *F17C 2250/0636* (2013.01); *F17C 2260/021* (2013.01); *F17C 2260/044* (2013.01); *F17C 2265/063* (2013.01); *F17C 2270/0171* (2013.01)

(58) Field of Classification Search
CPC .......... F17C 2201/035; F17C 2201/054; F17C 2203/0391; F17C 2205/0326; F17C 2205/0332; F17C 2205/0338; F17C 2205/0352; F17C 2205/0314; F17C 2205/0364; F17C 2221/014; F17C 2223/0161; F17C 2223/035; F17C 2225/0161; F17C 2225/033; F17C 2225/0115; F17C 2225/035; F17C 2227/0393; F17C 2227/0107; F17C 2250/043; F17C 2250/0626; F17C 2250/0636; F17C 2250/0434; F17C 2250/075; F17C 2260/021; F17C 2260/044; F17C 2260/036; F17C 2265/063; F17C 2270/0171
See application file for complete search history.

(56) References Cited

U.S. PATENT DOCUMENTS

| | | | | |
|---|---|---|---|---|
| 5,325,894 | A | * 7/1994 | Kooy | F17C 5/007 141/2 |
| 5,353,849 | A | * 10/1994 | Sutton | F17C 13/023 141/46 |
| 5,771,946 | A | 6/1998 | Kooy et al. | |
| 6,505,469 | B1 | * 1/2003 | Drube | F17C 7/04 62/48.1 |
| 6,799,429 | B2 | * 10/2004 | Drube | F17C 9/02 62/50.2 |
| 7,637,280 | B2 | 12/2009 | Gaget et al. | |
| 8,353,314 | B2 | * 1/2013 | Radford | F17C 13/04 251/149.6 |
| 8,671,997 | B2 | * 3/2014 | Allidieres | F17C 13/026 141/82 |
| 9,546,645 | B2 | * 1/2017 | Allidieres | F04B 23/02 |
| 9,752,727 | B2 | * 9/2017 | Drube | F17C 7/02 |
| 9,752,728 | B2 | * 9/2017 | Tang | F17C 7/04 |
| 9,869,428 | B2 | * 1/2018 | Drube | F04B 15/08 |
| 10,125,751 | B2 | * 11/2018 | Johnson | F17C 7/04 |
| 10,767,573 | B2 | * 9/2020 | Högnabba et al. F02M 21/0221 | |
| 11,079,071 | B2 | * 8/2021 | Nagura | B67D 7/0492 |
| 11,248,747 | B2 | * 2/2022 | Gustafson | F17C 3/00 |
| 2004/0221918 | A1 | * 11/2004 | Viegas | F17C 9/00 141/82 |
| 2008/0307798 | A1 | * 12/2008 | Luo | F17C 13/02 220/560.12 |
| 2015/0330572 | A1 | * 11/2015 | Jansson | F17C 5/04 141/4 |
| 2016/0003524 | A1 | * 1/2016 | Blalock | F25J 1/0012 62/48.2 |
| 2017/0108170 | A1 | 4/2017 | Gustafson | |
| 2021/0372565 | A1 | * 12/2021 | Beuneken | F17C 5/02 |
| 2022/0026024 | A1 | * 1/2022 | Beuneken | F17C 13/025 |
| 2022/0026028 | A1 | * 1/2022 | Beuneken | F17C 5/06 |

FOREIGN PATENT DOCUMENTS

| | | |
|---|---|---|
| FR | 2 845 451 | 4/2004 |
| FR | 2 941 767 | 8/2010 |
| WO | WO 2014/091060 | 6/2014 |

OTHER PUBLICATIONS

French Search Report and Written Opinion for FR 1 872 429, dated Jul. 26, 2019.

\* cited by examiner

CRYOGENIC FLUID STORAGE TANK

CROSS-REFERENCE TO RELATED APPLICATIONS

This application is a § 371 of International PCT Application PCT/FR2019/052793, filed Nov. 25, 2019, which claims § 119(a) foreign priority to French patent application FR 1872429, filed Dec. 6, 2018.

BACKGROUND

Field of the Invention

The invention relates to a cryogenic fluid storage tank.

More specifically, the invention relates to a tank for storing cryogenic fluid, and in particular a two-phase mixture of liquid and of gas, comprising a first casing intended to contain the cryogenic fluid, a vaporized gas drawing-off pipe comprising a first upstream end connected to the upper part of the first casing in order to draw-off fluid in the gaseous state, said vaporized gas drawing-off pipe comprising a vaporizer and at least one regulating valve toward a downstream distribution end, the tank further comprising a circuit for filling the tank, comprising a first filling pipe having an upstream end intended to be connected to a fluid source and a downstream end connected to the lower portion of the first casing, the filling circuit comprising a second filling pipe having an upstream end intended to be connected to the fluid source and a downstream end connected to the upper portion of the first casing, the filling circuit comprising a set of one or more distribution valve(s) configured to allow distribution of the fluid originating from the fluid source in the filling pipes, the tank comprising a pipe for pressurizing the first casing comprising a first end connected to the lower end of the first casing and a second end connected to the upper part of the first casing, the pressurization pipe comprising at least one regulating valve and a heater, in particular a vaporization heat exchanger, the tank further comprising an air venting regulator connected to the upper end of the first casing.

Related Art

Maintaining a constant pressure inside such tanks is difficult or unsatisfactory. The air venting equipment (back pressure regulator) in the event of excess pressure in the tank is separate from the regulating device/economizer that maintains the pressure in the tank above a minimum value. A separate device is provided for regulating when filling the tank.

The known systems require complex adjustments. Furthermore, the adjustments of these different devices (two or three devices) can prove to be inconsistent/conflicting.

Moreover, a complex system is often required either for implementing pressure regulation in the lower part of the tank (in the liquid part) or for safely filling the tank.

SUMMARY OF THE INVENTION

An aim of the present invention is to overcome all or some of the aforementioned disadvantages of the prior art.

To this end, the tank according to the invention, and also in accordance with the generic definition provided in the above preamble, is basically characterized in that the set of one or more distribution valve(s) of the filling circuit, the regulating valve of the pressurization pipe, the regulating valve of the drawing-off circuit and the air venting regulator are integrated into the same module of one or more valve(s) sharing at least one valve element.

Furthermore, embodiments of the invention can comprise one or more of the following features:

- the module of one or more valve(s) comprises a first orifice intended to be connected to a fluid source with a view to filling the tank, a second orifice connected to the downstream end of the first filling pipe, a third orifice connected to the vaporized gas drawing-off pipe, a fourth orifice connected to a gas discharging zone, such as the atmosphere, a fifth orifice connected to the second end of the pressurization pipe, and a sixth orifice connected to the second end of the pressurization pipe of the first casing, with the module of one or more valve(s) comprising at least one movable element allowing the circulation of fluid through the orifices to be controlled, and in particular the fluid connection or non-connection between at least two of said orifices;
- the tank comprises a set of one or more sensor(s) measuring the pressure in the first casing, and optionally in the filling circuit, and in that the module of one or more valve(s) is sensitive to the pressure measured by the set of one or more sensor(s) and is configured to automatically control, as a function of the pressure measured by the set of one or more sensor(s), the flows of fluid via the set of one or more distribution valve(s) of the filling circuit, and/or via the regulating valve of the pressurization pipe and/or via the regulating valve of the drawing-off circuit and/or via the air venting regulator;
- the at least one movable element of the module of one or more valve(s) is sensitive to the pressure measured by the set of one or more sensor(s) and is configured to automatically control the fluid connection or non-connection between at least two orifices as a function of the pressure measured by the set of one or more sensor(s);
- the set of one or more sensor(s) comprises a sensor for detecting a pressure or a mechanical connection at the first orifice, when said sensor for detecting a pressure or a mechanical connection at the first orifice detects a pressure or a mechanical connection that is higher than a determined high threshold, the at least one movable element of the module of one or more valve(s) is configured to switch to a "filling mode", in which the third orifice and the fourth orifice are closed and the first orifice is fluidly connected to the second orifice and/or to the sixth orifice;
- in the filling mode, the at least one movable element of the module of one or more valve(s) is configured to automatically regulate the pressure in the first casing to a predetermined pressure setpoint (Pc) during filling, by ensuring automatic distribution of the flow of fluid originating from the source in the first and second filling pipes as a function of the pressure setpoint Pc and of the pressure measured by the set of one or more sensor(s), with the distribution of the flow in said first and second pipes being implemented by connecting the first orifice to the second orifice and/or to the sixth orifice;
- when said sensor for detecting a pressure or a mechanical connection at the first orifice detects a pressure or a mechanical connection that is lower than a determined low threshold, the at least one movable element of the module of one or more valve(s) is configured to switch to a non-filling mode, in which the first orifice is closed;
- in the non-filling mode, the at least one movable element of the module of one or more valve(s) is configured to automatically maintain the pressure in the first casing at a minimum determined pressure value by ensuring, when the pressure in the first casing is lower than said minimum value, that liquid taken from the first casing is circulated in the heater and that this heated fluid is re-introduced into the first casing via a flow of fluid between the second orifice and the fifth orifice;

in the non-filling mode, the at least one movable element of the module of one or more valve(s) is configured to automatically reduce, during drawing-off via said drawing-off pipe, the pressure in the first casing below a first maximum value by ensuring, when the pressure in the first casing is higher than said first maximum value, that gas taken from the first casing is circulated toward the downstream distribution end of the gas drawing-off pipe via a flow of fluid between the fifth orifice and the third orifice;

the at least one movable element of the module of one or more valve(s) comprises a sector or distributor that is translationally and/or rotationally movable;

the at least one movable element of the module of one or more valve(s) is translationally or rotationally movable between a distinct first position and a distinct second position respectively corresponding to the "filling" and "non-filling" modes, and in that, in each of the first and second positions, said at least one movable element of the module of one or more valve(s) is rotationally and/or translationally movable in order to control the fluid connection or non-connection between at least two of the orifices;

in the non-filling mode, the at least one movable element of the module of one or more valve(s) is configured to automatically reduce the pressure in the first casing below a second maximum value by ensuring, when the pressure in the first casing is higher than said second maximum value, that gas taken from the first casing at the end is circulated toward the fourth orifice via the fifth orifice, in order to ensure that said gas is discharged, for example, by venting;

said at least one movable element being moved according to the pressure difference between, on the one hand, a setting force corresponding to a minimum pressure value and, on the other hand, the pressure measured by the set of one or more sensor(s);

the module of one or more valve(s) comprises at least one electrically controlled valve and an electronic device for controlling the controlled valve configured to control the position of the valve (opening/closing/connection or non-connection of orifices) as a function of, on the one hand, the minimum pressure value and, on the other hand, the pressure measured by the set of one or more sensor(s);

the air venting regulator comprises a pneumatic valve or an electrically controlled valve configured to control the opening and the closing of the valve in relation to the atmosphere as a function of the pressure measured by the set of one or more sensor(s) in relation to a determined high threshold;

the air venting regulator is configured to automatically maintain the pressure in the first casing below a second maximum value by ensuring, when the pressure in the first casing is higher than said second maximum value, that the gas taken from the first casing is discharged toward the outside atmosphere;

the module of one or more valve(s) comprises one or more linear movement automated distribution valve(s) and/or one or more rotary valve(s);

the pressure measured by the set of one or more sensor(s) comprises at least one from among: the pressure in the upper part of the first casing, the pressure in the lower part of the first casing, a pressure difference between the pressure in the upper part of the first casing and the pressure in the lower part of the first casing.

BRIEF DESCRIPTION OF THE FIGURES

Further particular features and advantages will become apparent upon reading the following description, which is provided with reference to the drawings, in which.

DETAILED DESCRIPTION OF THE INVENTION

Figure 1:
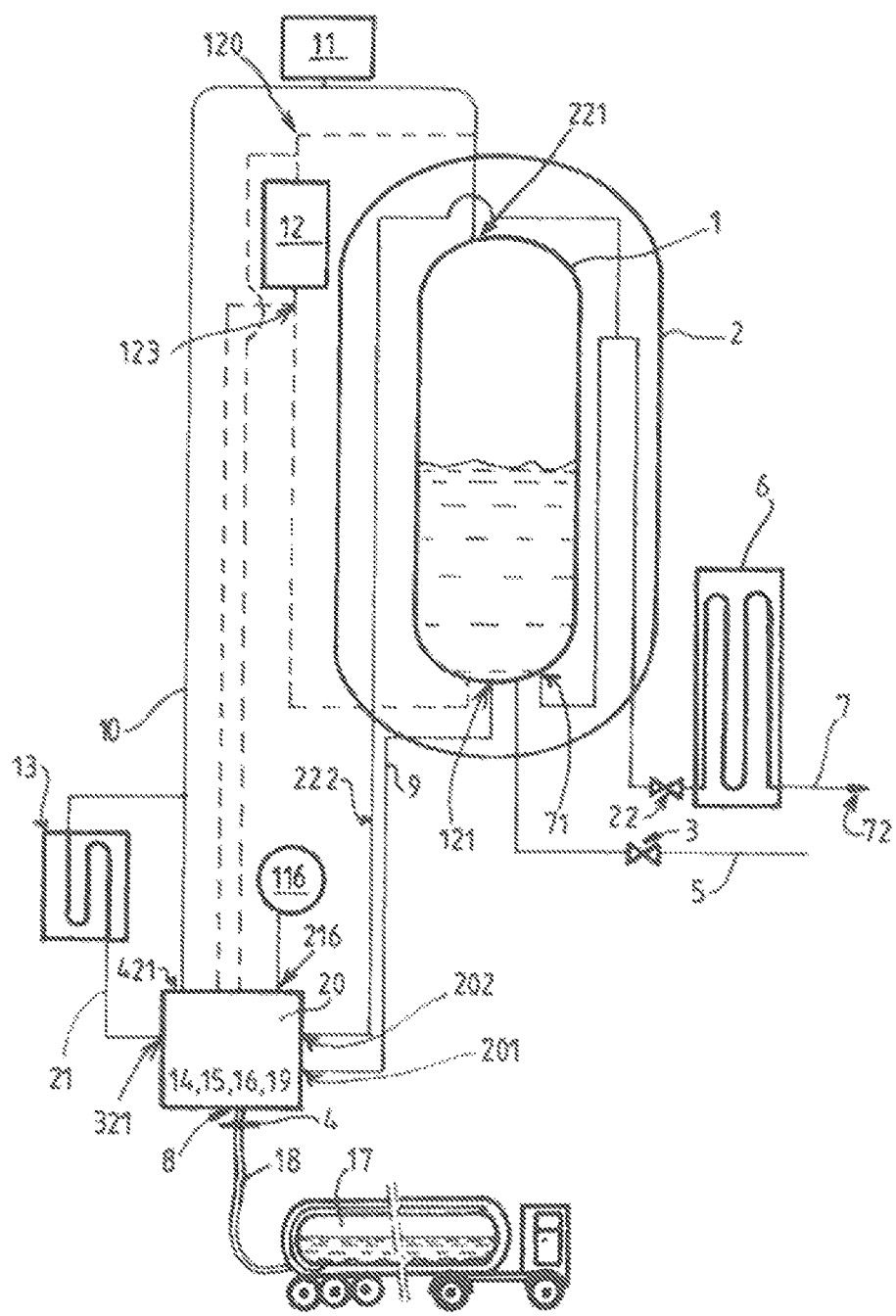
FIG. 1 shows a schematic and partial vertical section view illustrating an example of the structure and of the operation of one possible embodiment of the tank.

The tank shown in FIG. 1 is a tank for storing cryogenic fluid, and in particular a two-phase mixture of liquid and of gas.

Preferably, the tank is a double-casing cryogenic tank, comprising a first internal casing 1 intended to contain the cryogenic fluid. The first casing 1 is preferably surrounded by a second casing 2 and the tank can comprise thermal insulation in the space between the two casings (in particular a vacuum space).

Typically, the first casing 1 contains a liquid phase in the lower part (cryogenic fluid in liquid form at a very low temperature, for example, nitrogen is at a temperature of −185° c. at a pressure of 2 bar, the value of the temperature depends on the equilibrium pressure) and a gaseous phase in the upper part ("gaseous ceiling").

Conventionally, the tank comprises at least one drawing-off pipe 5, 7 having an upstream end connected to the first casing 1 and being configured to allow fluid contained in the first casing 1 to be drawn-off toward the outside of the tank. For example, and as illustrated, the tank can comprise a first drawing-off pipe 5, the upstream end of which is connected to the lower part of the first casing 1 in order to draw-off liquid (and preferably via a valve 3).

Similarly, the tank can comprise another (or second) drawing-off pipe 10, 222, 7, a first upstream end 221 of which is connected to the upper part of the first casing 1 in order to draw-off fluid in the gaseous state. This vaporized gas drawing-off pipe 7 comprises a valve 15 for regulating the flow of fluid toward a downstream distribution end 72 provided with a vaporizer 6 (or heater), and optionally at least one other valve 22.

The vaporized gas drawing-off pipe 7 preferably comprises a second upstream end 71 connected to the lower part of the first casing 1. This second upstream end 71 is connected to the vaporizer 6, to allow fluid to be drawn-off in the liquid state and to be vaporized in the vaporizer 6 with a view to supplying vaporized gas at the downstream distribution end 72. In other words, the first 221 and second 71 upstream ends can be connected parallel to the downstream end 72 and to the vaporizer 6.

This external use vaporizer 6 can be a heat exchanger used to convert the cryogenic liquid or gas drawn-off from the internal tank into gas through an exchange with the ambient atmosphere.

The tank comprises a set 12 of one or more sensor(s) measuring the pressure in the first casing 1 in its upper and/or lower part.

Furthermore, the tank comprises a pipe 9, 21, 10 for pressurizing the first casing 1 comprising a first end 121 connected to the lower end of the first casing 1 and a second end 221 connected to the upper part of the first casing 1.

The pressurization pipe 21 comprises at least one regulating valve 14 and a heater 13, in particular a vaporization heat exchanger using, for example, air as a heat source.

The regulating valve 14 of the pressurization pipe 21 is configured to automatically maintain the pressure in the first casing 1 at a minimum determined value Pc by ensuring, when the pressure in the first casing 1 is lower than said minimum value, that liquid taken from the first casing 1 is circulated in the heater 13 and that this heated fluid is re-introduced into the first casing 1.

The heater 13 allows liquid taken from the bottom of the first casing 1 to be vaporized in order to generate the gas, which allows, when necessary, the pressure of the gaseous phase to be increased by means of the regulator 14. This pressurization regulator 14 opens, if necessary, the passage for the liquid from the liquid phase to its gaseous phase when the pressure of the gaseous phase is lower than a pressure that is set on the appliance, in particular the working pressure.

The regulating valve 14 of the pressurization pipe 21 preferably is sensitive to the pressure measured by the set 12 of one or more sensor(s) measuring the pressure in the first casing 1.

In other words, this regulating valve 14 can comprise at least one movable element closing or opening a passage for the fluid in the pressurization pipe 21. This movable element is opened or closed, in particular according to the pressure difference between, on the one hand, a setting force corresponding to a minimum pressure value and, on the other hand, the pressure measured by the set 12 of one or more sensor(s).

Of course, as an alternative embodiment or in combination, the regulating valve 14 of the pressurization pipe 21 could comprise at least one electrically controlled valve and an electronic device for controlling the controlled valve configured to control the opening and the closing of the valve as a function of, on the one hand, the minimum pressure value and, on the other hand, the pressure measured by the set 12 of one or more sensor(s).

Preferably, the regulating valve 15 is configured to automatically reduce, during drawing-off via said drawing-off pipe 7, the pressure in the first casing 1 below a first determined maximum value. This is obtained by ensuring, when the pressure in the first casing 1 is higher than said first maximum value, that gas taken from the first casing 1 at the second end 221 of the pressurization pipe 21, 10 is circulated toward the downstream distribution end 72 of the gas drawing-off pipe 7, via the fifth orifice 321 and the third orifice 202. The first determined maximum value depends on the type of tank and on the application.

Therefore, this valve 15 (or economizer) is configured to open the passage between the gaseous phase of the first casing 1 and the downstream 72 when the pressure in this upper part of the first casing 1 is higher than a predetermined and, for example, preset pressure (first maximum value). For example, this predetermined pressure is equal to the working pressure of the tank Pc+0.5 bar. This allows the pressure in the gaseous phase of the first casing 1 to be regulated downward, when necessary, when gas originating from the tank is used.

In other words, when the pressure in the first casing 1 is higher than said first maximum value, pressurized gas is taken from the first casing in order to reduce the pressure therein, and this gas can be routed toward the downstream distribution end 72. In other words, this gas is used by the application supplied by the tank.

Conventionally, the tank comprises a protection component 11, such as a valve and/or a shear disk, allowing fluid to be released toward the outside in the event of pressure exceeding a limit in the first casing 1. Typically, this limit is the maximum allowable pressure of the tank (provided by the manufacturer).

The tank also preferably comprises an air 116 venting regulator 16 connected to the upper end of the first casing.

As is particularly illustrated in FIG. 1, the air venting regulator 16 can be connected to the upper end of the first casing 1 via a portion of the pressurization pipe 21, in particular via the first end 221 of the pressurization pipe.

The air venting regulator 16, 20 is configured to control the opening and the closing of a valve in relation to the atmosphere as a function of the pressure measured by the set 12 of one or more sensor(s) in relation to a determined high threshold.

The air venting regulator 16 can be configured to automatically maintain the pressure in the first casing 1 (or at the lower end 71 of the first casing) below a second maximum value by ensuring, when the pressure in the first casing 1 (respectively at the lower end 71) is higher than said second maximum value, that the gas taken from the first casing 1 is discharged toward the outside atmosphere.

This second maximum value can be higher than the first maximum value and can range between, for example, this first maximum value and the maximum allowable pressure. This second maximum value typically can be equal to the opening pressure of the protection component 11, less one bar.

This allows the pressure of the gaseous phase to be maintained, when necessary, in the event that gas is not used by the client, without applying the one or more safety component(s) 11. Indeed, when gas is not drawn-off for a long period (no possible discharge of gas via the end 72, for example), this causes a natural increase in pressure inside the first casing 1.

This also allows, when necessary, the liquid gas pressure on the drawing-off line 5 to be stabilized.

In other words, when the pressure in the tank exceeds the setpoint value (second maximum value), the air venting regulator 16 purges the excess pressure toward the outside 116 (toward the atmosphere or a collection zone).

As shown in FIG. 1, the tank comprises a filling circuit that comprises a first filling pipe 9 with an upstream end intended to be connected to a fluid source (such as a hose 18 of a container 17 transported by a truck) and a downstream end 121 connected to the lower portion of the first casing 1.

The filling circuit preferably comprises a second filling pipe 10 having an upstream end intended to be connected to the fluid source 17 (via the sixth orifice 421 and the module of one or more valve(s)) and a downstream end 221 connected to the upper portion of the first casing 1 (without passing through the heater 13).

As illustrated, the end of the first filling pipe 9 connected to the lower part of the tank can be shared with the pressurization pipe 21 (via the regulating valve 14) and the filling circuit in the liquid phase (via the set 19 of one or more distribution valve(s)). The upstream ends of the first 9 and second 10, 421 filling pipes are configured to be simultaneously connected to the same fluid source 17, for example, at a common inlet 8 or flange.

The filling circuit comprises a set 19 of one or more distribution valve(s) configured to allow the fluid originating from the fluid source 17 to be distributed in one or the filling pipe(s) 9, 10.

The set 19 of one or more distribution valve(s) is configured, for example, to automatically regulate the pressure in the first casing 1 to a predetermined setpoint pressure Pc during filling by ensuring automatic distribution of the flow of fluid originating from the source 17 in the filling pipes 9, 10, as a function of the pressure setpoint Pc and of the pressure measured by the set 12 of one or more sensor(s).

The measured pressures can be used directly as energy to activate the set of valves 14, 15, 16 and 19 or can be used indirectly (the measured pressure information is used to generate a force for controlling the set of valves).

For example, the predefined pressure setpoint Pc typically is the working pressure of the tank (for example, as a function of the requirement of the gas user and of the installation downstream of the tank). This pressure can be the pressure at which the fluid of the gaseous ceiling must be maintained (according to the use in the gaseous ceiling), or the pressure at which the liquid part in the bottom of the tank must be maintained (according to the use of the fluid in its liquid phase).

The maximum working pressure of the tank generally ranges between one and forty bar, in particular between 7 and 12 bar depending on the types and sizes of tanks. This maximum working pressure (or "maximum allowable working pressure") is, for example, defined by the tank manufacturer.

Preferably, the tank comprises a filling terminal 8 or a flange for connecting the delivery hose 18 of the source 17.

The set 19 of one or more distribution valve(s) can be configured to automatically regulate the pressure in the first casing 1 to the predetermined pressure setpoint Pc of the tank during filling. This regulation is implemented by filling the first casing 1 only via the first filling pipe 9 or only via the second filling pipe 10, or via the two pipes simultaneously.

The set 19 of valves regulates the flow (through section) and the distribution of the cryogenic liquid supplied by the source 17 in the two pipes 9, 10 in order to maintain or reach this setpoint pressure Pc.

The set 19 of one or more valve(s) can comprise at least one pneumatic valve. Preferably, the set 19 of one or more valve(s) is a solely mechanical and/or pneumatic device.

For example, a pressure is maintained on a valve (gas pressure and/or spring or equivalent) that converts the valve into a pressure regulator.

For example, as previously, the set 19 of one or more distribution valve(s) is sensitive to the pressure measured by the set 12 of one or more sensor(s) measuring the pressure in the first casing 1. In other words, the set 19 of one or more distribution valve(s) can comprise at least one movable element closing or opening a passage for the fluid between the fluid source 17 and the one or more filling pipe(s) 9, 10. This movable element is, for example, moved into a plurality of positions according to the pressure difference between, on the one hand, a setting force corresponding to the predetermined pressure setpoint Pc and, on the other hand, the pressure measured by the set 12 of sensor(s).

According to an advantageous feature, the set 19 of one or more distribution valves of the filling circuit, the regulating valve 14 of the pressurization pipe 21, the regulating valve 15 of the drawing-off circuit and the air venting regulator 16 can be integrated in the same module 20 of one or more valve(s) (or in the same housing or set) sharing at least one valve element.

For example, the module 20 of one or more valve(s) can comprise a first orifice 8 intended to be connected to a fluid source 17 with a view to filling the tank.

The module 20 of one or more valve(s) can comprise a second orifice 201 connected to the downstream end of the first filling pipe 9.

The module 20 of one or more valve(s) can comprise a third orifice 202 connected to the vaporized gas drawing-off pipe 222, 7.

The module 20 of one or more valve(s) can comprise a fourth orifice 216 connected to a zone 116 for discharging gas, such as the atmosphere.

The module 20 of one or more valve(s) can comprise a fifth orifice 321 connected to the second end 221 of the pressurization pipe 21, 10.

The module 20 of one or more valve(s) can comprise a sixth orifice 421 connected to the second filling pipe 10.

Preferably, the module 20 of one or more valve(s) comprises at least one movable element allowing the fluid connection or non-connection between at least two of said orifices to be controlled. In other words, the module 20 of one or more valve(s) is configured to allow the closure or the opening of all or some of the orifices according to the status or the operating mode of the tank.

The set 12 of one or more sensor(s) measures the pressure in the first casing 1, and optionally in the filling circuit (and optionally at the first orifice 8). The module 20 of one or more valve(s) is sensitive to the pressure measured by the set 12 of one or more sensor(s) and is configured to automatically control, as a function of the pressure measured by the set 12 of one or more sensor(s), the flows of fluid via the set 19 of one or more distribution valve(s) of the filling circuit, via the regulating valve 14 of the pressurization pipe 21, via the regulating valve 15 of the drawing-off circuit and via the air venting regulator 16.

The at least one movable element of the module 20 of one or more valve(s) is, for example, sensitive to the pressure measured by the set of one or more sensor(s) and is configured to automatically control the fluid connection or non-connection between at least two orifices as a function of the pressure measured by the set 12 of one or more sensor(s).

The module 20 of one or more valve(s) thus can comprise a sensor 4 for detecting a pressure or a mechanical connection at the first orifice 8, and, when said sensor 4 for detecting a pressure or a mechanical connection at the first orifice 8 detects a pressure or a mechanical connection that is higher than a determined high threshold (for example, a pressure higher than the atmospheric pressure), the at least one movable element of the module 20 of one or more valve(s) is configured to switch to a "filling mode".

Figure 2:
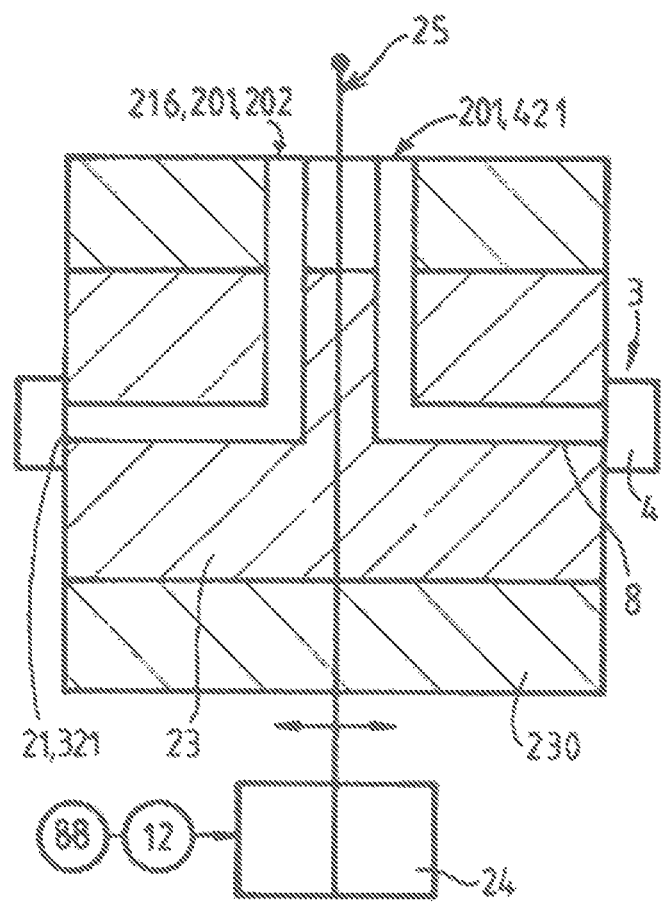
FIG. 2 shows a schematic and partial longitudinal section view illustrating an example of the structure and of the operation of one or more valve(s) for controlling the pressure of such a tank.

For the sake of simplification, in FIG. 2, reference 4 denotes this sensor and optionally also a block of one or more valve(s) or a connector of the delivery truck. This block of one or more valve(s) also could be included in this invention or be outside the invention (i.e. this block of one or more valve(s) could be in the module 20 of one or more valve(s) or outside said module).

In this filling mode, the third orifice 202 (toward the gas drawing-off line) and the fourth orifice 216 (toward the discharging zone) are closed and the first orifice 8 is fluidly connected to the second orifice 201 (toward the liquid phase of the tank) and/or to the sixth orifice 421 (toward the gaseous phase of the tank) to allow the filling as described above.

However, when the sensor 4 for detecting a pressure or a mechanical connection at the first orifice 8 detects a pressure or a mechanical connection that is lower than a determined low threshold (lower than or equal to atmospheric pressure) this means that there is no connection for filling. In this case, the at least one movable element of the module 20 of one or more valve(s) is configured to switch to a "non-filling mode", in which the first orifice 8 is closed and the fluid passage from the first orifice 8 to the second orifice 201 and the sixth orifice 421 is closed.

In this non-filling mode, the at least one movable element of the module 20 of one or more valve(s) is configured to automatically maintain the pressure in the first casing 1 at a determined minimum pressure value by ensuring, when the pressure in the first casing 1 is lower than said minimum value, that liquid taken from the first casing 1 is circulated in the heater 13 and that this heated fluid is re-introduced into the first casing 1 via a flow of fluid between the second orifice 201 and the fifth orifice 321.

Furthermore, in the non-filling mode, the at least one movable element of the module 20 of one or more valve(s) can be configured to automatically reduce, when drawing-off via said drawing-off pipe 7, the pressure in the first casing 1 below a first maximum value. To this end, when the pressure in the first casing 1 is higher than said first maximum value, the module 20 of one or more valve(s) ensures that gas taken from the first casing 1 is circulated toward the downstream distribution end 72 of the gas drawing-off pipe 7 via a flow of fluid between the fifth orifice 321 and the third orifice 202.

The at least one movable element of the module 20 of one or more valve(s) can comprise a translationally and/or rotationally movable sector 23 or distributor.

Figure 3:
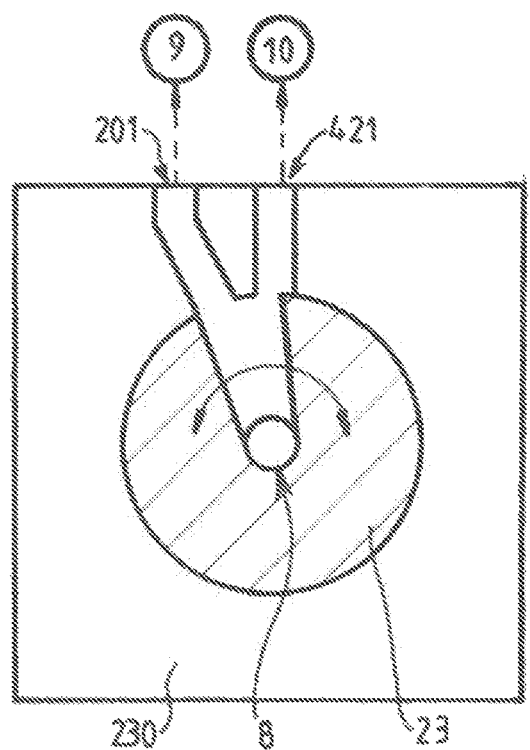
FIG. 3 shows a schematic and partial transverse section view of the structure of FIG. 2 in a first operating mode when filling the tank.
Figure 4:
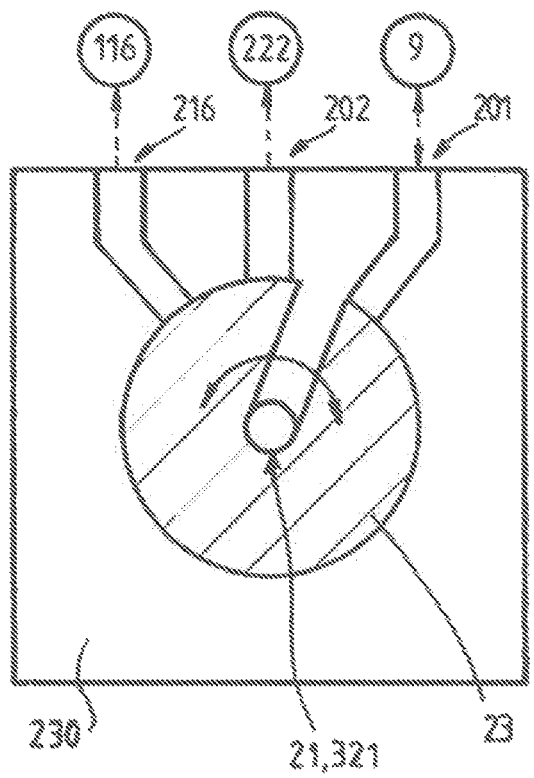
FIG. 4 shows a schematic and partial transverse section view of the structure of FIG. 2 in a second operating mode when not filling the tank.

As illustrated in FIG. 2 to FIG. 4, the module 20 of one or more valve(s) can comprise a movable element formed by a rotary selector 23 provided with a cutout, one or more internal passage(s) or a peripheral geometry ensuring or not ensuring fluid connection to the aforementioned orifices of a frame 230.

For example, in the filling mode (see FIG. 3), the longitudinal position of the rotary selector 23 in relation to the frame 230 allows only the flow of fluid between the first orifice 8 (arrival of filling fluid) and one or the second orifice(s) 201 and the sixth orifice 421 to be regulated. This distribution of the flow between these orifices 201, 421 is obtained, for example, by rotating the selector 23.

However, in the non-filling mode (see FIG. 4), for example, another longitudinal position of the rotary selector 23 in relation to the frame 230 allows only the flow of fluid between the second orifice 201, the fourth orifice 216, the third orifice 202 and the fifth orifice 321 to be regulated.

Thus, the angular position of the rotary selector 23 ensures the flow of fluid in order to ensure, depending on the situations, that the pressure of the tank increases, or that the pressure of the tank decreases by drawing-off or by being discharged outside 116.

The relative longitudinal position of the rotary selector 23 with respect to the orifices (FIG. 3 or FIG. 4) can be controlled by an actuator 24 that is sensitive to the pressure measured by the set of sensors 12, 88, for example.

Similarly, a manual control 25 can be provided for this translation movement (and optionally for the rotation). This manual control allows, for example, the distribution of the flow of fluid originating from the source 17 to be manually forced into the filling pipes 9, 10 (and/or the closure of the filling circuit and/or of the other circuits).

Reference 4 in FIG. 2 denotes the sensor for connecting to the orifice 8 and/or a block of one or more valve(s). Such a block of one or more valve(s) optionally also can be contemplated at the other end 21, 321 of the selector 23 and/or at the second orifice 201.

Of course, the invention is not limited to this embodiment since any other type of rotary, translationally movable selector can be contemplated. Similarly, the various connections or closures of the orifices can be obtained by one or more pneumatic, electrical or other controlled valves: two-way valves, three-way valves or any configuration or combination allowing this aforementioned control.

The module 20 of one or more valve(s) could comprise a translationally movable element, in particular the set 19 of one or more valve(s) could comprise a slide valve. For example, see document FR 2845451A1.

The valve or frame movements may or may not ensure the fluid circulations described above by implementing suitable distributions of fluid between the pipes and orifices.

The set 12 of one or more sensor(s) preferably measures (and displays and/or transmits, if applicable) the pressure and/or the information relating to the pressure prevailing in the gaseous phase (upper part) and/or the pressure and/or the pressure information relating to the lower part (in the liquid phase), as well as the level of liquid in the liquid phase (lower part of the first casing). This level of liquid can be determined by the pressure difference between the bottom and the top of the first casing, from which the height of the hydrostatic fluid column is deduced.

The pressure of the fluid at the lower end of the first casing is equal to the pressure of the gaseous phase, increased by the hydrostatic pressure generated by the height of liquid in the liquid phase.

To this end, the set 12 of one or more sensor(s) can comprise a pressure tap 120 for the gaseous phase (measured in the upper part of the first casing 1) and a pressure tap 123 for the liquid phase (measured in the lower part of the first casing 1). These two pressure taps are symbolically shown by the ends of the dashed lines connected in the lower and upper part of the tank and to the measurement housing 12, see FIG. 1.

Conventionally, the set 12 of one or more sensor(s) can comprise sensors of the type measuring a static pressure and/or a differential pressure.

For example, a detection component (integrated in or separate from the set 12 of sensors) can measure the pressure in the fluid source 17, 18 (for example, at the hose) and the set 19 of one or more distribution valve(s) can be configured to interrupt any passage of fluid originating from the source 17, 18 toward the filling pipes 9, 10 when the pressure measured by the detection component 4 is lower than a second determined threshold (for example, lower than one barg=one relative bar). This automatic safety measure prevents any spillage from the tank, particularly if the hose breaks or is incorrectly connected.

The set 19 of one or more valve(s) can also integrate pressure setpoints (pressure setpoint Pc and first safety threshold that corresponds to the maximum allowable pressure in the tank).

The module 20 of one or more valve(s) can be configured to automatically interrupt any passage of fluid originating from the source 17 toward the filling pipes 9, 10 when the pressure measured by the set 12 of one or more sensor(s) is higher than a first determined safety threshold (for example, this first threshold can be equal to the maximum allowable pressure of the tank, less a difference that is equal to one bar, for example).

Furthermore, the module of one or more valve(s) can be configured to implement automatic distribution of the flow of fluid originating from the source 17, predominantly, and preferably exclusively, in the second filling pipe 10 when the pressure measured by the set 12 of one or more sensor(s) is lower than the safety threshold and higher than the pressure setpoint Pc. In other words, during filling, if the measured pressure ranges between the setpoint pressure Pc and the first safety threshold, the module 20 of one or more valve(s) favors filling via the pipe 10.

Furthermore, this module 20 can be configured to simultaneously implement automatic distribution of the flow of fluid originating from the source 17 in the two filling pipes 9, 10 when the pressure measured by the set 12 of one or more sensor(s) is equal or substantially equal to the pressure setpoint Pc (i.e. the working pressure plus or minus a few percent). Preferably, the filling flow is equally distributed between the two filling pipes 9, 10, but could be distributed in different adjustable proportions.

Furthermore, the module 20 can be configured to implement automatic distribution of the flow of fluid originating from the source 17, predominantly, and preferably exclusively, in the first filling pipe 9 when the pressure measured by the set 12 of one or more sensor(s) is lower than the pressure setpoint Pc.

Thus, depending on the pressure measured in the tank, the module 20 can favor filling from above (as a spray in order to limit/reduce the pressure) or from below (in order to increase the pressure inside the tank) or both (in order to keep the pressure substantially constant).

Thus, in order to ensure filling, the operator/deliverer connects a pressurized liquefied gas source 17 to the tank. For example, they connect the end of the hose 18 to a terminal or flange of the module 20. They thus connect the source 17 to the filling circuit. The deliverer can open an isolation valve and the module 20 of one or more valve(s) will automatically implement (or prevent) the transfer of fluid toward the tank according to the predetermined pressure setpoint Pc and the pressure measured by the set 12 of one or more sensor(s).

Thus, whilst being simple and inexpensive, the tank has a mechanism that automatically regulates the pressure in the tank during and outside of the filling operations.

The tank is thus automatically protected against any overpressures or underpressures.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising" "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A tank for storing a two-phase mixture of liquid and of gaseous cryogenic fluid, comprising:
    a first casing intended to contain the cryogenic fluid;
    a vaporized gas drawing-off pipe comprising a first upstream end connected to the upper part of the first casing in order to draw-off fluid in the gaseous state, said vaporized gas drawing-off pipe comprising a vaporizer and at least one regulating valve toward a downstream distribution end; a circuit for filling the tank;
    a pipe for pressurizing the first casing comprising a first end connected to the lower end of the first casing and a second end connected to the upper part of the first casing, the pressurization pipe comprising at least one regulating valve and a heater, the heater being a vaporization heat exchanger; and
    an air venting regulator connected to the upper end of the first casing, wherein:
        the circuit comprises a first filling pipe having an upstream end intended to be connected to a fluid source and a downstream end connected to the lower portion of the first casing, a second filling pipe having an upstream end intended to be connected to the fluid source and a downstream end connected to the upper portion of the first casing, and a set of one or more distribution valve(s) configured to allow distribution of the fluid originating from the fluid source in the first and second filling pipes; and
        the set of one or more distribution valve(s) of the filling circuit, the regulating valve of the pressurization pipe, the regulating valve of the drawing-off circuit and the air venting regulator are integrated in a same module of one or more valve(s) sharing at least one valve element.

2. The tank of claim 1, wherein the module comprises a first orifice intended to be connected to a fluid source for filling the tank, a second orifice connected to the downstream end of the first filling pipe, a third orifice connected to the vaporized gas drawing-off pipe, a fourth orifice connected to a gas discharging zone, a fifth orifice connected to the second end of the pressurization pipe, a sixth orifice connected to the second end of the pressurization pipe of the first casing, and at least one movable element allowing the circulation of fluid through the orifices to be controlled.

3. The tank of claim 2, wherein at least one movable element allows connection or non-connection between at least of two of said orifices.

4. The tank of claim 2, wherein the fourth orifice is connected to the atmosphere.

5. The tank of claim 1, wherein:
the tank comprises a set of one or more sensor(s) measuring a pressure in the first casing and optionally also a pressure in the filling circuit;
the module is sensitive to the pressure measured by the set of one or more sensor(s) and is configured to automatically control, as a function of the pressure measured by the set of one or more sensor(s), the flows of fluid via one or more of:
the set of one or more distribution valve(s) of the filling circuit,
the regulating valve of the pressurization pipe,
the regulating valve of the drawing-off circuit, and
the air venting regulator.

6. The tank of claim 5, wherein the at least one movable element of the module of one or more valve(s) is sensitive to the pressure measured by the set of one or more sensor(s) and is configured to automatically control the fluid connection or non-connection between at least two orifices as a function of the pressure measured by the set of one or more sensor(s).

7. The tank of claim 6, wherein:
the set of one or more sensor(s) comprises a sensor for detecting a pressure or a mechanical connection at the first orifice; and
when said sensor for detecting a pressure or a mechanical connection at the first orifice detects a pressure or a mechanical connection that is higher than a determined high threshold, the at least one movable element of the module is configured to switch to a "filling mode" in which the third orifice and the fourth orifice are closed and the first orifice is fluidly connected to the second orifice and/or to the sixth orifice.

8. The tank of claim 7, wherein:
in the filling mode, the at least one movable element of the module of one or more valve(s) is configured to automatically regulate the pressure in the first casing to a predetermined pressure setpoint (Pc) during filling by ensuring automatic distribution of the flow of fluid originating from the source in the first and second filling pipes as a function of the pressure setpoint Pc and of the pressure measured by the set of one or more sensor(s); and
distribution of the flow in said first and second pipes is implemented by connecting the first orifice to the second orifice and/or to the sixth orifice.

9. The tank of claim 7, wherein, when said sensor for detecting a pressure or a mechanical connection at the first orifice detects a pressure or a mechanical connection lower than a determined low threshold, the at least one movable element of the module of one or more valve(s) is configured to switch to a non-filling mode in which the first orifice is closed.

10. The tank of claim 9, wherein, in the non-filling mode, the at least one movable element of the module of one or more valve(s) is configured to automatically maintain the pressure in the first casing at a minimum determined pressure value by ensuring, when the pressure in the first casing is lower than said minimum value, that liquid taken from the first casing is circulated in the heater and then re-introduced into the first casing via a flow of fluid between the second orifice and the fifth orifice.

11. The tank of claim 9, wherein, in the non-filling mode, the at least one movable element of the module of one or more valve(s) is configured to automatically reduce, during drawing-off via said drawing-off pipe, the pressure in the first casing below a first maximum value by ensuring, when the pressure in the first casing is higher than said first maximum value, that gas taken from the first casing is circulated toward the downstream distribution end of the gas drawing-off pipe via a flow of fluid between the fifth orifice and the third orifice.

12. The tank of claim 2, wherein the at least one movable element of the module of one or more valve(s) comprises a sector or distributor that is translationally and/or rotationally movable.

13. The tank of claim 12, wherein:
the at least one movable element is translationally or rotationally movable between a distinct first position and a distinct second position respectively corresponding to the "filling" and "non-filling" modes; and
in each of the first and second positions, said at least one movable element of the module of one or more valve(s) is rotationally and/or translationally movable in order to control the fluid connection or non-connection between at least two of the orifices.

14. The tank of claim 9, wherein, in the non-filling mode, the at least one movable element of the module of one or more valve(s) is configured to automatically reduce the pressure in the first casing below a second maximum value by ensuring, when the pressure in the first casing is higher than said second maximum value, that gas taken from the first casing at the end is circulated toward the fourth orifice via the fifth orifice, in order to ensure that said gas is discharged, for example, by venting.

15. The tank of claim 14, wherein, in the non-filling mode, the at least one movable element of the module of one or more valve(s) is configured to automatically reduce the pressure in the first casing below a second maximum value by ensuring, when the pressure in the first casing is higher than said second maximum value, that gas taken from the first casing at the end is circulated toward the fourth orifice via the fifth orifice, in order to ensure that said gas is discharged by venting.

* * * * *